United States Patent
Homann et al.

(10) Patent No.: US 7,255,818 B2
(45) Date of Patent: Aug. 14, 2007

(54) PROCESS CONTROL FOR GAS-ASSISTED INJECTION MOLDING APPLICATIONS

(75) Inventors: Gregory A. Homann, Canton, MI (US); James Hendry, Brooksville, FL (US)

(73) Assignee: Lear Corporation, Southfield, MI (US)

( * ) Notice: Subject to any disclaimer, the term of this patent is extended or adjusted under 35 U.S.C. 154(b) by 271 days.

(21) Appl. No.: 10/904,396

(22) Filed: Nov. 8, 2004

(65) Prior Publication Data

US 2006/0097418 A1 May 11, 2006

(51) Int. Cl.
B29C 45/76 (2006.01)
B29D 22/00 (2006.01)

(52) U.S. Cl. .................. 264/40.3; 264/572; 425/149

(58) Field of Classification Search .............. 264/40.3, 264/572; 425/149
See application file for complete search history.

(56) References Cited

U.S. PATENT DOCUMENTS 5,707,659 A * 1/1998 Erikson .................. 425/130

FOREIGN PATENT DOCUMENTS

| CA | 2208200 A1 | 5/1990 |
| JP | 07132531 A | 5/1995 |
| JP | 11170289 A | 6/1999 |
| WO | WO-98/39150 A2 | 9/1998 |

* cited by examiner

Primary Examiner—Suzanne E. McDowell
(74) Attorney, Agent, or Firm—Earl LaFontaine

(57) ABSTRACT

A method and system for controlling a fluid-assisted injection molding process for producing a molded plastic article. The fluid can be gas, water or another fluid. One or more pressure transducers are positioned in the mold cavity and generate signals to control the initiation of the pressurized fluid, the packing of the material in the mold and/or the switchover from the packing phase to the holding phase. The transducers can be positioned at or near the gate or pre-gate, at or near the fluid channel area, and/or at or near the end of the fill area.

33 Claims, 2 Drawing Sheets

PROCESS CONTROL FOR GAS-ASSISTED INJECTION MOLDING APPLICATIONS

TECHNICAL FIELD

The present invention relates to gas-assisted plastic injection molding systems and more particularly the control of gas-assisted plastic injection molding systems and processes

BACKGROUND OF THE INVENTION

There are numerous known systems for plastic injection molding. In conventional plastic injection molding systems, plastic pellets are melted in an injection molding machine and advanced by a screw ram into a mold cavity. The mold cavity is formed between two mold halves (a core member and a cavity member), typically through one or more sprue bushings, a manifold and/or a hot runner system. The two halves of the mold are clamped, typically under high pressure, and the plastic is injected into the mold cavity, again under significant pressure in most instances.

The molten plastic material in the cavity is allowed to cool and harden in the cavity, typically by a cooling system that circulates a cooling fluid through one or more of the mold members. When the part has sufficiently hardened, the mold is opened and the part is removed typically by one or more ejector pins.

Some of the known systems utilize a gas in the injection molding process and are commonly known as "gas-assisted injection molding" systems. In these systems, the gas is injected into the molten plastic material through the plastic injection nozzle itself, or through one or more pin mechanisms strategically positioned in the mold, sprue bushings, manifold, and/or hot runner systems. It is also possible to inject the gas directly into the molten plastic in the barrel of the injection molding machine. The gas, which typically is an inert gas such as nitrogen, is injected under pressure and forms one or more hollow cavities or channels in the molded part.

The benefits of gas-assisted injection molding processes are well-known, and include the cost savings through the use of less plastic material, producing parts which are lighter in weight, producing parts in a faster manner, and producing parts which have better surface definitions and finishes.

Another plastic injection molding system that utilizes gas injects the gas into the mold cavity along one or both exterior surfaces of the molded part. The pressurized gas forces the plastic against the opposite surface or surfaces of the mold cavity and forms a part with superior surface characteristics on the appearance surfaces.

One particular gas-assisted injection molding system utilizes a connecting spill-over cavity coupled to the mold cavity. Such system is shown, for example, in U.S. Pat. No. 5,098,637. In this system, a portion of the plastic from the mold cavity is displaced into the spill-over cavity when the charge of pressurized gas is introduced. This process has particular use for door and grip handles.

Although many of these gas-assisted injection molding systems operate satisfactorily and have produced commercially acceptable plastic injected molded parts and components, there is a need for improved systems and processes and particularly those which do not utilize spill-over cavities.

SUMMARY OF THE INVENTION

It is an object of the present invention to provide an improved "gas assisted injection molding" system and process. It is another object of the present invention to provide an improved gas-assisted injection molding process and system for making plastic parts and components in which a spill-over cavity is not utilized or required.

It is another object of the present invention to provide a gas-assisted injection molding system and process in which the amount of plastic material injected into the mold and the pressures of the injected gas are controlled. It is a still further object of the present invention to provide a gas-assisted injection molding system and process in which the gas pressures in the mold are controlled in certain manners in order to provide a satisfactory product in an improved and beneficial manner.

In accordance with the present invention, a mold is provided which has a cavity suitable for injection molding. The plastic material distribution system is included for delivering the molten plastic to an entry port or gate into the cavity. In many cases, the cavity will have a thick section located between the gate and the last point in the cavity to fill with plastic, the thick section being the area which will have its molten interior evacuated by a gas under pressure.

One or more pressure transducers are located in the mold or cavity. The pressure transducers measure the cavity pressure at various points in the injection molding process and are used to control, for example, the initiation of the gas injection, the packing of the material in the mold, the point at which the process switches from the packing phase to the holding pressure phase, and/or venting of the gas.

The pressure transducers can be positioned near the resin entry point or gate, or adjacent the thicker sections which will be cored out by the gas. The transducers can also be installed near the end of the fill area of the mold cavity for purposes of monitoring the process. This transducer preferably is located between the thicker section of the molded part and the end of the fill cavity.

The pressure transducer can also be located in a pre-gate position if a sub-runner is utilized in the system.

The gas injection into the plastic material in the mold is initiated preferably at a set pressure. That pressure is maintained until the gas injection is terminated. In one embodiment, the cavity pressure will continue to gradually rise as the plastic material shrinks. The gas may also be vented from the interior of the channel at this point. It is also possible to allow the cavity pressure to decay to a determined level in order to delay venting of the gas pressure.

In another embodiment, the gas pressure can be profiled in an increasing or decreasing manner as it is injected. Process timers or other modes of controlling the events in the process may be required with this embodiment.

In one preferred embodiment, three pressure transducers are provided, one at or near the gate, one at or on the gas channel area, and one at the end of the fill area. Other methods or embodiments in accordance with the present invention, can utilize a single transducer or a pair of transducers.

With the present invention, the plastic is injected into and fills the mold cavity except for a hollow section or sections where the gas is injected or remains within the product. Once the plastic has been fully injected into the mold cavity and the gas pressure in the hollow portions within the part has been vented or exhausted, the plastic material is allowed to solidify or cool sufficiently in order to become self-supporting. At this point, the mold is opened and the part is removed from the mold. Preferably, one or more ejector pins are utilized to assist in removing the part from the mold.

The present invention provides a molded plastic part which has improved surface characteristics, that can be manufactured and produced in a commercially acceptable manner, and does not utilize spill-over cavities or reservoirs. With the present invention, timers and linear position sensing are not needed. The present invention minimizes or eliminates inconsistencies in the gas-assist injection molding process, such inconsistencies typically caused by the volume of resin in the cavity, the length of the gas channels in the part and the residual wall thickness.

Other embodiments, benefits and features of the present invention will become apparent from the following description of the invention when viewed in accordance with the accompanying drawings and appended claims.

DESCRIPTION OF PREFERRED EMBODIMENTS

The present invention uses gas-assisted plastic injection molding techniques in order to produce a commercially acceptable quality plastic part. The part can be produced or utilized in an acceptable timing cycle and does not need or utilize spill-over cavities.

Cavity pressure transducers are utilized which measure the pressure of the gas in the mold cavity at various points or stages in the molding cycle or process. The feedback from the pressure transducers trigger various steps in the molding process, such as the initiation of the pressurized gas, the venting of the gas, various changes in the gas pressure as needed, and/or the profiling of the gas as needed for the particular process.

Pressure transducers that can be utilized with the present invention are conventional commercially available devices and can be, for example, force, strain gage or piezoelectric.

As with any conventional plastic injection molding process, a mold is utilized with two halves which when closed form a cavity suitable for injection molding. A material distribution system and an injection molding machine is utilized to deliver the molten plastic to an entry point or gate into the mold cavity.

Typically, the part to be produced has one or more thick sections, such as a rib member, which will be evacuated or cored out by the injected gas as part of the process.

It is to be understood that any type of mold member can be utilized in accordance with the present invention. In addition, any type of gas pin assembly or assemblies, ejector pin assembly or assemblies, vent valve mechanisms, injection molding machines and machine nozzles, can be utilized with the present invention, so long as the objectives and purposes of the present invention are met. Different components of this type are within the skill of persons of ordinary skill in the art. Also, any conventional type of gas and gas supply sources can be utilized. The gas itself is preferably an inert gas, such as nitrogen. It is also possible to utilize the present invention with a water-assisted injection molding process.

The gas, water or other fluid for the gas-assisted injection molding process can be provided through any conventional manner, including the machine nozzle. Also, it is to be understood that any number of gas pin assemblies can be utilized with the present invention. The type of gas pin assembly and the number of assemblies utilized depend on the size and configuration of the mold cavity and the resulting part or component to be produced. In addition, the type of plastic resin or material that can be utilized with the present invention can be of any conventional type. The type of plastic typically depends on the part to be produced and its application, as well as the specifications for the resultant product.

Figure 3:
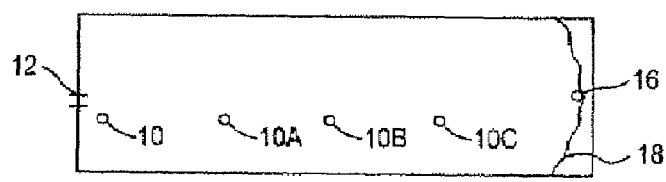
FIGS. 3-4 are schematic illustrations of mold cavities illustrating various pressure transducer embodiments and locations in accordance with the present invention.

In accordance with a preferred embodiment of the present invention, a cavity pressure transducer is positioned near the resin entry point or gate of the mold cavity. This is shown in FIG. 3 where the pressure transducer is referred to by the reference numeral 10 and is positioned adjacent the gate member 12 of the mold cavity 8. For practical purposes, the transducer 10 is located at the gate area, but it is not restricted to that area. It is preferred that the pressure transducer be positioned in the area between the thicker section of the molded part, which will later be cored out by the gas and the gate 12. For example, the pressure transducer can be located at point 10A or 10B or 10C. However, it is believed that higher accuracy and greater control will be easier to achieve if the pressure transducer is located closer to the gate area.

The transducer could also be positioned in a pre-gate position, prior to entry of the mold cavity. The transducer could be positioned, for example, in a sub-runner, in the injection molding machine, or in a hot runner nozzle.

Figure 4:
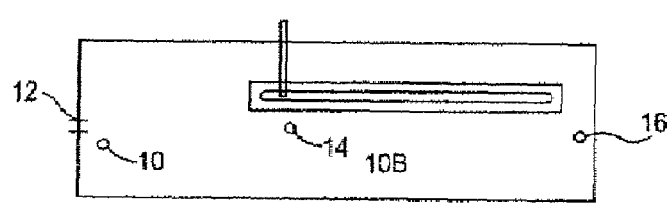

It is also possible to supply a second transducer 14 at or on the thicker section in the mold cavity that is to be cored out by the gas injection process. This is shown in FIG. 4. The pressure transducer 14 can control the "off" function of the gas injection, as well as the venting function of the gas from the interior of the thick section after the gas injection is finished. The pressure transducer 14 can also be used to control the initiation of the gas injection, provided the cavity pressure is present in this area when it is desired to turn the gas "on."

An additional transducer 16 can be positioned near the end 18 of the fill area of the mold cavities for the purposes of monitoring the process. This is shown in FIGS. 3 and 4. Although the transducer 16 can be located closer to the end of the fill cavity for accuracy, it can also be located anywhere between the thick section and the end of the fill cavity.

The transducers send electrical signals to a fluid controller that is typically positioned next to the injector molding machine. If gas is utilized, the gas from the gas source, such as a nitrogen generator, bottle, bank of bottles or intensifier (booster) or the like, is supplied by the controller. If water is utilized, the fluid can be supplied by any conventional source. The controller in turn is positioned to initiate the fluid, profile it and vent it from the mold cavity according to the specifics of the process needed to make the part. The controller can be of any conventional type, such as those supplied by Cinpres, Alliance or Epcon Both transducers 14 and 16 can be used to initiate the fluid injection process, provided that the cavity pressure is present at a level suitable for control purposes. It is anticipated in this regard, that during the packing phase, the level of cavity pressure that is present in these areas will be relatively low.

As a result, using these locations to generate a control signal for the gas injection will be dependent on a sensitivity and scale of the transducer as it relates to the level of cavity pressure that is present.

As plastic begins to fill the mold cavity, a gradual rise in the cavity pressure will be detected in the gate area. Once the cavity is filled, the molding machine is switched from the high pressure filling stage to a low velocity packing phase. During the packing phase, there will be a sharp rise in cavity pressure as additional material is forced under pressure into the mold cavity. There also might be a slight gradual increase in cavity pressure at the thicker section and also at the end of the fill cavity at transducer 16. This is determined by the actual location of the transducer as well as the level of cavity pressure present at that location during packing. Cavity pressure will not be present at the extreme end of the fill until the cavity is completely filled. Pressure levels in the cavity as received by the transducers are fed back as electrical signals to one gas controller which then can initiate, change or stop the flow of gas as desired.

When the cavity pressure at the chosen location reaches the desired level, a signal is generated by the transducer that initiates the injection of the gas or other fluid into the thick section of the part. The controller continues and/or profiles the pressure of the fluid which is injected into the mold cavity. Packing of the cavity will continue to the desired level of cavity pressure, at which point a signal will be generated which switches the molding machine from the packing phase to the holding pressure phase. The holding phase is maintained for a predetermined period of time.

In this regard, it is not necessary that the packing of the cavity be accomplished by controlling the velocity of the screw. Instead, the packing can be accomplished by switching from velocity control for cavity filling to a constant packing pressure. It is also possible to switch the molding machine from the packing pressure phase to the holding pressure phase by the use of a process timer.

The fluid injection is initiated at a predetermined set pressure depending on the parameters of the specification provided for the molded product. This typically is after about 90-99% of the plastic has been injected. It is possible to inject the remaining 10-1% of the plastic material after the fluid injection has terminated or simultaneously with the fluid injection. The cavity pressure at or near the fluid channel will be at a level close to this setting but may accurately reflect the set point issue. The set pressure is maintained until the fluid injection is terminated. In one embodiment, the pressure at or near the fluid channel will continue to gradually rise as the plastic material surrounding it shrinks so long as the pressure is maintained at the desired level. This makes possible the use of a cavity pressure level setting to terminate the injection of the fluid. At this point, it may be desirable to vent the fluid from the interior of the channel formed by the fluid to the atmosphere which will result in a sudden loss of cavity pressure at this location. An additional step of allowing the cavity pressure to decay to a determined level may also be used to delay venting of the fluid pressure from the interior to the atmosphere.

It also is possible to profile the fluid pressure in an increasing or decreasing manner as it is injected. The gas pressure can also be both increased and decreased as desired. This can be done to minimize the amount of gas used, for dimensional reasons, and the like. Profiling of the gas may or may not allow for termination of the gas or controlling the venting of the gas by the use of cavity pressure set points. It still may be necessary to incorporate process timers or other modes of controlling events in the process in these instances or if a transducer is not available in this location.

A pressure gradient will exist from the gate area or resin entry point to the last area of the mold to fill. The pressure gradient will be dependent on factors such as wall thickness, part geometry, flow length, and the like. Since cavity pressure is a measure of the volume of material present in the cavity based on its resistance to flow, the pressure of the gas as it is injected should be at a level to cause the desired result. It is expected that the level will be greater than that of the cavity pressure which exists at or on the thicker section of the part. It is also expected that the pressure will be at a level lower than the cavity pressure at the gate and higher than the cavity pressure at the end of the flow length. This is dependent on many variables, such as part geometry, type of resin, location of the gate, location and dimensions of the thick section.

Regardless of the location of the transducer used to initiate the gas injection phase, the start of the gas injection preferably is prior to the decay of cavity pressure, which will begin when the resin starts to shrink. This is between the beginning of the packing phase and the point of which the cavity pressure reaches its peak.

The injection of the gas into the plastic material will help force the plastic into all of the areas of the mold and will create a hollow section in the thicker section of the molded article. The material forced out from the thicker section will be displaced, for example, into the nominal wall thickness of the part. It also is possible to provide a movable member in the mold which is moved mechanically or by the gas pressure to allow the displaced material from the thicker section to be relocated. Also, a signal can be generated from either the cavity pressure or by the use of timers to cause an action within the cavity to allow resin displacement.

The holding pressure is applied for a desired period as determined by the part specification at which time it is terminated. The termination of the holding pressure can be achieved by the use of process timers or cavity pressure control.

In one preferred embodiment, three transducers are utilized. Once of the transducers 10 is positioned near the gate 8, another of the transducers 14 is positioned at or on the gas channel area 15, and the other transducer 16 is positioned at the end 18 of the fill area. This is shown in FIG. 3. This results in a reliable gas-assisted plastic injection molding process.

Figure 2:
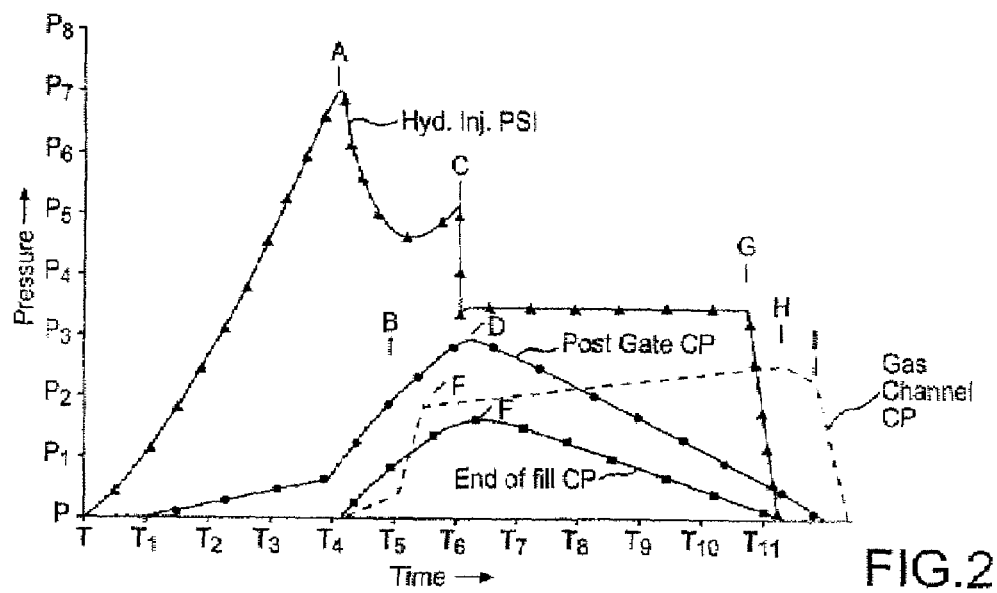
FIG. 2 is a graph depicting a process in accordance with the present invention.

FIG. 2 is a graph of pressure versus time for an embodiment in accordance with the present invention. The hydraulic injection pressure is indicated by graph line 20, the post gate cavity pressure (CP) is indicated by the graph line 22, the cavity pressure at the end of the fill is represented by the graph line 24, and the gas channel cavity pressure is by the dotted graph line 26.

In accordance with this embodiment, the cavity is filled to a level determined by a linear position at which point the molding machine is switched from high pressure/high speed filling to a controlled velocity-low speed packing. This is point A on graph line 20 ($T_0$-$T_4$). At the desired cavity pressure in either the post gate area or the end of the fill area, the gas is injected at the desired level ($T_4$-$T_6$). This is shown at point B. At this point, material is displaced from the thicker section of the part into the nominal wall thickness of the part, or into a molded feature of the part created within the cavity.

At the desired pressure level D, a signal is generated and the molding machine is switched from the controlled velocity/low speed packing phase to the holding pressure phase C.

The gas injection is continued at a constant pressure until the cavity pressure at or on the gas channel has reached the desired level H, at which point the cavity pressure at this location will begin to decay to the desired level I, when it is then vented to the atmosphere. Initial decay may not be desired and thus the gas pressure within the cavity can be vented to the atmosphere directly when the desired level H is achieved.

The holding pressure is continued until it is terminated by a process timer or by a signal generated from an increase or decay in cavity pressure at location G. The end of the fill cavity pressure is used either for generating control inputs for process events or for monitoring purposes.

Another embodiment of the present invention utilizes only two transducers, one at the gate area and one at or near the gas channel area. In this embodiment, the cavity is filled to a level determined by a linear position on the molding machine screw at which point the molding machine will switch from filling to low speed control velocity packing. Again, this is point A on graph line 20 in FIG. 2. At the desired cavity pressure in the post gate area, the gas is injected at the desired level B. This is shown on graph line 22. This displaces material from the thicker section of the part forcing the displaced material into other areas. At the desired level of cavity pressure shown at point D on graph line 22, the molding machine is switched from the packing phase to the holding phase. This is shown at point C on graph line 20.

The gas injection continues until the desired cavity pressure at or on the gas channel is achieved. This is point H. At this point, the cavity pressure is vented to the atmosphere or the pressure is allowed to decay to desired level I when it is then vented to atmosphere. The holding pressure is continued until it is terminated either by a process timer or by a signal generated from an increase or delay in the cavity pressure at any location, such as location G.

Another method in accordance with the present invention utilizes only a single transducer located at the gate area of the mold cavity. In this method, the cavity is filled to a level determined by a linear position on the molding machine screw at which point the molding machine is switched from the filling phase to the packing phase. At the desired cavity pressure in the post gate area, the gas is injected at the desired level B. This displaces material from the thicker section of the part into the part's nominal wall thickness, or into a molded feature of the part created within the cavity.

At the desired level of cavity pressure D, the molding machine is switched from the packing phase to the holding phase C. The gas injection then continues until it is terminated by a process timer. The holding pressure is also continued until it is terminated by a process timer.

A still additional method in accordance with the present invention can utilize a single transducer located at or on the gas channel area. This method is dependent on cavity pressure being present at levels suitable for control purposes. In this method, the cavity is filled to a level determined by a linear position on the molding machine screw at which point the molding machine is switched from the filling phase to the packing phase, which is pressure controlled and uses a process timer.

At the desired cavity pressure at or on the gas channel area, the gas is injected at the desired level B. This displaces material from the thicker sections of the part into other areas. The packing pressure is maintained for an established period controlled by a process timer at which time the molding machine will either terminate the application of injection pressure, or continue at another lower pressure for the holding phase, which is also regulated by a process timer. If a second lower pressure is not used encompassing an additional step, the first pressure step is continued as both pack and hold.

The gas injection then continues until the desired cavity pressure at or on the gas channel is achieved (H) at which point the cavity pressure is vented to the atmosphere or the pressure is allowed to decay to a desired level (I) when it is then vented to the atmosphere.

Figure 1:
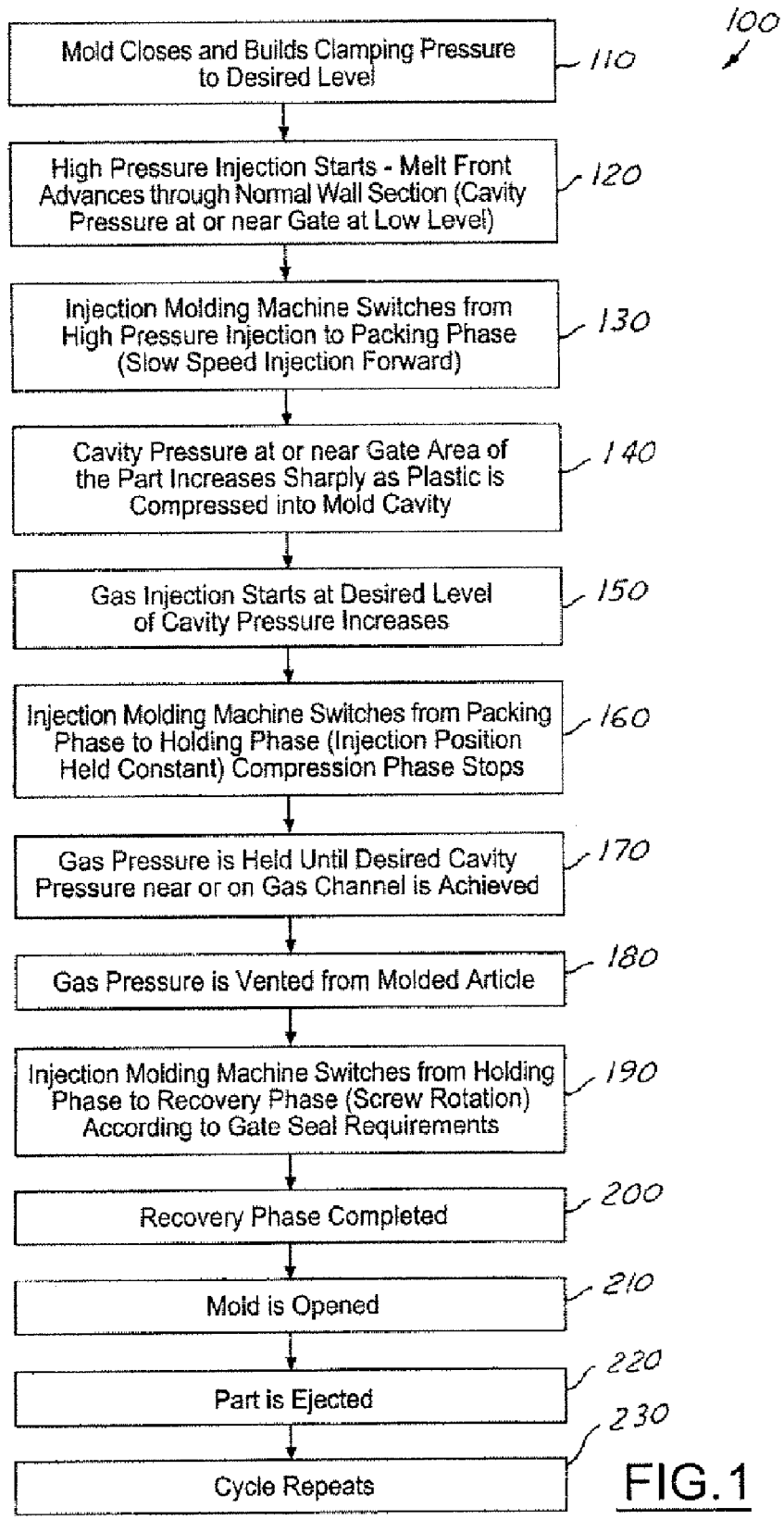
FIG. 1 is a flow diagram of a preferred embodiment of the present invention.

A flow diagram schematically showing the method steps in accordance with a preferred embodiment of the invention is shown in FIG. 1 and referred to generally by the reference numeral 100. In step 110, the mold is closed, and the clamping pressure is built up to a desired preset level. Thereafter, as shown in step 120, the high pressure injection starts. At this point, the melt front would advance through the nominal wall section, and the cavity pressure will be at or near the gate at a low level.

Thereafter, as shown in step 130, the injection molding machine will switch from the high pressure injection phase to the packing phase. This will be the slow speed forward injection. The cavity pressure at or near the gate area of the part will increase sharply as the plastic is compressed into the mold cavity. This is shown in step 140. As shown in step 150, the gas injection will then start at the desired level of cavity pressure increase. The gas pressure increase is measured by a pressure transducer and fed back to the master controller for the system.

As the injection molding machine switches from the packing phase to the holding phase, with the injection position being held constant, the compression phase terminates. This is shown in step 160. The gas pressure is then held constant until the desired cavity pressure at or near the gas channel is achieved. This is shown in step 170. The gas pressure is vented from the molded article as shown in step 180, and the injection molding machine switches from the holding phase to the recovery phase according to the gate seal requirements. This is shown in step 190. At this point, the recovery phase is completed. This is shown in step 200. Once the plastic is cooled sufficiently to have the plastic molded part be self-supporting, the mold is opened as shown in step 210, and the part is ejected. This is shown in step 220. Thereafter, the cycle is repeated, as shown in step 230.

While particular embodiments of the invention have been shown and described, numerous variations and alternative embodiments will occur to those skilled in the art. Accordingly, it is intended that the invention be limited only in terms of the appended claims.

What is claimed is:

1. A method for producing a plastic part utilizing a fluid-assisted plastic injection molding process:

providing a mold cavity in a mold for formation of a plastic molded part having at least one thicker section, the mold cavity having a gate for entry of plastic material;

positioning a first pressure transducer in the mold cavity, the pressure transducer being positioned between the gate and the thicker section;

injecting a quantity of plastic material into the mold cavity, said quantity being less than an amount needed to completely fill the mold cavity;

detecting a first pre-established pressure reading from said first pressure transducer;

injecting a pressured fluid from a controller into the plastic material in the mold cavity based on the detection of said pre-established pressure, said pressured fluid forming a hollow space in the at least said one thicker section of the mold cavity and;

packing the plastic material in the mold cavity.

2. The method as claimed in claim 1, wherein detecting the first pre-established pressure reading creates an electric signal, said electric signal being transmitted to the gas controller.

3. The method as claimed in claim 1 further comprising the step of holding the pressure in the mold cavity for a predetermined period of time.

4. The method as claimed in claim 3, wherein the holding pressure is maintained until the injection of the fluid is finished.

5. The method as claimed in claim 1 further comprising the steps of venting the fluid from the mold cavity, opening the mold and ejecting the part from the mold cavity.

6. The method as claimed in claim 5 further comprising allowing the pressure of the fluid to decay prior to the venting of the fluid from the mold cavity.

7. The method as claimed in claim 1, wherein the pressure of the fluid which is injected into the mold cavity is profiled in an increasing or decreasing manner, or both.

8. The method as claimed in claim 1 further comprising the step of positioning a second pressure transducer adjacent the thicker section.

9. The method as claimed in claim 8 further comprising the step of positioning a third pressure transducer adjacent the end of the mold cavity furthest away from the gate.

10. The method as described in claim 1 wherein the fluid is a gas.

11. The method as described in claim 1 wherein the fluid is a liquid.

12. A system for molding plastic articles by a fluid-assisted injection molding process, said system comprising:
an injection molding machine;
a mold positioned in said injection molding machine, said mold having an article defining mold cavity, said mold cavity having a gate, a thicker section and an extreme end;
a nozzle for injecting plastic material from said injection molding machine into said mold cavity;
a source of pressurized fluid;
three pressure transducers positioned in said mold cavity, a first transducer positioned adjacent said gate, a second transducer adjacent said thicker section, and a third transducer adjacent said extreme end; and
a controller for controlling the injection of fluid from said fluid source and into said mold cavity based on signals generated from said pressure transducers, said controller controlling the initiation, venting, timing and pressure of the fluid.

13. A method for producing a plastic part utilizing a fluid-assisted plastic injection molding process:
providing a mold cavity in a mold for formation of a plastic molded part having at least one thicker section, the mold cavity having a gate for entry of plastic material;
positioning a first pressure transducer in the mold cavity, the pressure transducer being positioned between the gate and the thicker section;
injecting a quantity of plastic material into the mold cavity, said quantity being less than an amount needed to completely fill the mold cavity;
detecting a first pre-established pressure reading from said first pressure transducer;
injecting a pressured fluid from a controller into the plastic material in the mold cavity based on the detection of said pre-established pressure, said pressured fluid forming a hollow space in the at least said one thicker section of the mold cavity; and
holding the pressure in the mold cavity for a predetermined period of time.

14. The method as claimed in claim 13, wherein detecting the first pre-established pressure reading creates an electric signal, said electric signal being transmitted to the gas controller.

15. The method as claimed in claim 13 further comprising the step of packing the plastic material in the mold cavity.

16. The method as claimed in claim 13, wherein the holding pressure is maintained until the injection of the fluid is finished.

17. A method for producing a plastic part utilizing a fluid-assisted plastic injection molding process:
providing a mold cavity in a mold for formation of a plastic molded part having at least one thicker section, the mold cavity having a gate for entry of plastic material;
positioning a first pressure transducer in the mold cavity, the pressure transducer being positioned between the gate and the thicker section;
injecting a quantity of plastic material into the mold cavity, said quantity being less than an amount needed to completely fill the mold cavity;
detecting a first pre-established pressure reading from said first pressure transducer;
injecting a pressured fluid from a controller into the plastic material in the mold cavity based on the detection of said pre-established pressure, said pressured fluid forming a hollow space in the at least said one thicker section of the mold cavity;
venting the fluid from the mold cavity; and
allowing the pressure of the fluid to decay prior to the venting of the fluid.

18. The method as claimed in claim 17, wherein detecting the first pre-established pressure reading creates an electric signal, said electric signal being transmitted to the gas controller.

19. The method as claimed in claim 17 further comprising the step of packing the plastic material in the mold cavity.

20. The method as claimed in claim 17 further comprising the step of holding the pressure in the mold cavity for a predetermined period of time.

21. The method as claimed in claim 17, wherein the pressure of the fluid which is injected into the mold cavity is profiled in an increasing or decreasing manner, or both.

22. The method as claimed in claim 17 further comprising the step of positioning a second pressure transducer adjacent the thicker section.

23. The method as claimed in claim 22 further comprising the step of positioning a third pressure transducer adjacent the end of the mold cavity furthest away from the gate.

24. The method as described in claim 17 wherein the fluid is a gas.

25. The method as described in claim 17 wherein the fluid is a liquid.

26. A method for producing a plastic part utilizing a fluid-assisted plastic injection molding process:
providing a mold cavity in a mold for formation of a plastic molded part having at least one thicker section, the mold cavity having a gate for entry of plastic material;

positioning a first pressure transducer in the mold cavity, the pressure transducer being positioned between the gate and the thicker section;

injecting a quantity of plastic material into the mold cavity, said quantity being less than an amount needed to completely fill the mold cavity;

detecting a first pre-established pressure reading from said first pressure transducer;

injecting a pressured fluid from a controller into the plastic material in the mold cavity based on the detection of said pre-established pressure, said pressured fluid forming a hollow space in the at least said one thicker section of the mold cavity; and profiling the fluid pressure in the mold cavity in an increasing or decreasing manner, or both.

27. The method as claimed in claim 26, wherein detecting the first pre-established pressure reading creates an electric signal, said electric signal being transmitted to the gas controller.

28. The method as claimed in claim 26 further comprising the step of packing the plastic material in the mold cavity.

29. The method as claimed in claim 26 further comprising the step of holding the pressure in the mold cavity for a predetermined period of time.

30. The method as claimed in claim 26 further comprising the step of positioning a second pressure transducer adjacent the thicker section.

31. The method as claimed in claim 30 further comprising the step of positioning a third pressure transducer adjacent the end of the mold cavity furthest away from the gate.

32. The method as described in claim 26 wherein the fluid is a gas.

33. The method as described in claim 26 wherein the fluid is a liquid.

* * * * *